(12) United States Patent
Niver (10) Patent No.: US 11,383,902 B2
(45) Date of Patent: Jul. 12, 2022

(54) PRESSURE RELIEF CAP

(71) Applicant: Bemis Manufacturing Company, Sheboygan Falls, WI (US)

(72) Inventor: Michael Andrew Niver, Plymouth, WI (US)

(73) Assignee: BEMIS MANUFACTURING COMPANY, Sheboygan Falls, WI (US)

( * ) Notice: Subject to any disclaimer, the term of this patent is extended or adjusted under 35 U.S.C. 154(b) by 248 days.

(21) Appl. No.: 16/514,766

(22) Filed: Jul. 17, 2019

(65) Prior Publication Data

US 2020/0024041 A1 Jan. 23, 2020

Related U.S. Application Data (60) Provisional application No. 62/699,326, filed on Jul. 17, 2018.

(51) Int. Cl.
| | | |
|---|---|---|
| B65D 51/16 | (2006.01) | |
| F01P 11/02 | (2006.01) | |
| B60K 15/04 | (2006.01) | |

(52) U.S. Cl.
CPC ...... B65D 51/1672 (2013.01); F01P 11/0238 (2013.01); B60K 15/0406 (2013.01); B60K 2015/0432 (2013.01)

(58) Field of Classification Search
CPC .. B65D 51/1672; B65D 55/022; B65D 41/04; B65D 51/1683; F01P 11/0238; B60K 2015/0432; B60K 15/0406; F16K 17/04; F16K 17/168; F16K 17/02

USPC ......... 220/203.01–203.27, DIG. 32, DIG. 33
See application file for complete search history.

(56) References Cited

U.S. PATENT DOCUMENTS

| | | | |
|---|---|---|---|
| 2,591,562 A | 4/1952 | Levell | |
| 3,111,239 A | 11/1963 | Ivins | |
| 3,164,288 A * | 1/1965 | Boomgaard | ......... F01P 11/0247 |
| | | | 220/203.24 |
| 3,203,445 A * | 8/1965 | Mccormick | .......... F01P 11/0247 |
| | | | 137/493.4 |
| 3,415,410 A | 12/1968 | Franchini | |
| 3,587,912 A | 6/1971 | Nagoya et al. | |
| 3,937,358 A | 2/1976 | Smith et al. | |
| 4,736,863 A | 4/1988 | Harris | |
| 4,830,058 A * | 5/1989 | Harris | ................ B60K 15/0406 |
| | | | 138/89 |
| 5,183,173 A * | 2/1993 | Heckman | ........... B60K 15/0406 |
| | | | 220/203.07 |
| 5,941,407 A * | 8/1999 | Del | ......................... F16J 13/24 |
| | | | 220/316 |

(Continued)

Primary Examiner — James N Smalley
(74) Attorney, Agent, or Firm — Michael Best & Friedrich LLP (57) ABSTRACT

A pressure relief cap includes a body engageable with a container and rotatable about an axis for coupling or decoupling the body from the container. The pressure relief cap also includes a handle and a motion control mechanism operable to selectively couple the handle to the body. The motion control mechanism includes a clutch plate moveable between an engaged position in which the clutch plate permits torque transfer from the handle to the body, and a disengaged position in which the clutch plate inhibits torque transfer from the handle to the body. The pressure relief cap also includes a relief valve for releasing pressure in response to elevated pressure within the container.

20 Claims, 7 Drawing Sheets

(56) References Cited

U.S. PATENT DOCUMENTS

| | | |
|---|---|---|
| 7,380,681 B2 | 6/2008 | Reutter |
| 7,588,159 B2 | 9/2009 | Otsuka |
| 8,353,418 B2 * | 1/2013 | Bork .................. B65D 51/1683 |
| | | 220/203.26 |
| 8,430,261 B2 | 4/2013 | Eggenreich et al. |
| 8,701,920 B2 | 4/2014 | Wiese et al. |
| D721,423 S | 1/2015 | Jacques et al. |
| 9,222,450 B2 | 12/2015 | Whelan et al. |
| 2003/0183632 A1 * | 10/2003 | Reutter .............. B60K 15/0406 |
| | | 220/203.23 |

* cited by examiner

PRESSURE RELIEF CAP

CROSS-REFERENCE TO RELATED APPLICATIONS

This application claims priority to U.S. Provisional Patent Application No. 62/699,326, filed on Jul. 17, 2018, the entire contents of which are incorporated by reference herein.

BACKGROUND

The present disclosure relates to caps for containers and, more particularly, to pressure relief caps.

SUMMARY

The present disclosure may provide, in one independent aspect, a pressure relief cap couplable to a container. The pressure relief cap may include a body engageable with the container, the body being rotatable about an axis to couple or decouple the body from the container, a handle, and a motion control mechanism operable to selectively couple the handle to the body. The motion control mechanism may include a clutch plate. The clutch plate may be movable between an engaged position, in which the clutch plate permits torque transfer from the handle to the body, and a disengaged position, in which the clutch plate inhibits torque transfer from the handle to the body. The pressure relief cap may also include a relief valve assembly with a manually-operable actuator. The clutch plate may be movable toward the disengaged position in response to elevated pressure within the container, and the actuator may be operable to open the relief valve assembly to allow the clutch plate to return to the engaged position.

The motion control mechanism may further include a diaphragm configured to move the clutch plate toward the disengaged position in response to elevated pressure within the container.

The diaphragm may include an outer periphery fixed to the body and an inner periphery movable relative to the outer periphery along the axis. The relief valve assembly may be coupled to the inner periphery of the diaphragm for movement therewith relative to the body.

The relief valve assembly may include a plunger coupled to the actuator and an auxiliary valve disposed within the plunger. The auxiliary valve may be configured to open automatically when pressure within the container exceeds a predetermined threshold pressure.

The handle may include a top side and a circumferential side extending downwardly from the top side, the actuator projecting from the top side by a first distance when the clutch plate is in the engaged position and the relief valve assembly is closed and by a second distance greater than the first distance when the clutch plate is in the disengaged position and the relief valve assembly is closed.

The motion control mechanism may include a piston configured to move the clutch plate toward the disengaged position in response to elevated pressure within the container.

The motion control mechanism may include a lip seal surrounding the piston.

The present disclosure may provide, in another independent aspect, a pressure relief cap couplable to a container. The pressure relief cap may include a body engageable with the container and rotatable about an axis to couple or decouple the body from the container, a handle, and a motion control mechanism operable to selectively couple the handle to the body. The motion control mechanism may include a ratchet and a clutch plate. The ratchet may be rotatable relative to the clutch plate to limit torque transfer from the handle to the body in at least one rotational direction. The clutch plate may be movable between an engaged position, in which the clutch plate is non-rotatably coupled to the body, and a disengaged position, in which the clutch plate is rotatable relative to the body. The pressure relief cap may also include a relief valve assembly with a manually-operable actuator. The clutch plate may be configured to move toward the disengaged position in response to elevated pressure within the container, and the actuator may be operable to open the relief valve assembly to allow the clutch plate to return to the engaged position.

The present disclosure may provide, in another independent aspect, a method of relieving pressure from a container prior to opening the container. The method may include depressing an actuator on a pressure relief cap to open a relief valve assembly of the pressure relief cap, venting gas from the container through the relief valve assembly, moving a clutch plate toward an engaged position in response to decreasing pressure within the container, and decoupling the pressure relief cap from the container by rotating a handle of the pressure relief cap in a loosening direction and transmitting torque from the handle to a body of the pressure relief cap via the clutch plate.

Other independent features and independent aspects of the disclosure may become apparent by consideration of the following detailed description and accompanying drawings.

Before any independent embodiments of the disclosure are explained in detail, it is to be understood that the disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use) associated with the particular value, etc.). Such terminology should also be considered as disclosing the range defined by the absolute values of the two endpoints. For example, the expression "from about 2 to about 4" also discloses the range "from 2 to 4".

DETAILED DESCRIPTION

Figure 1:
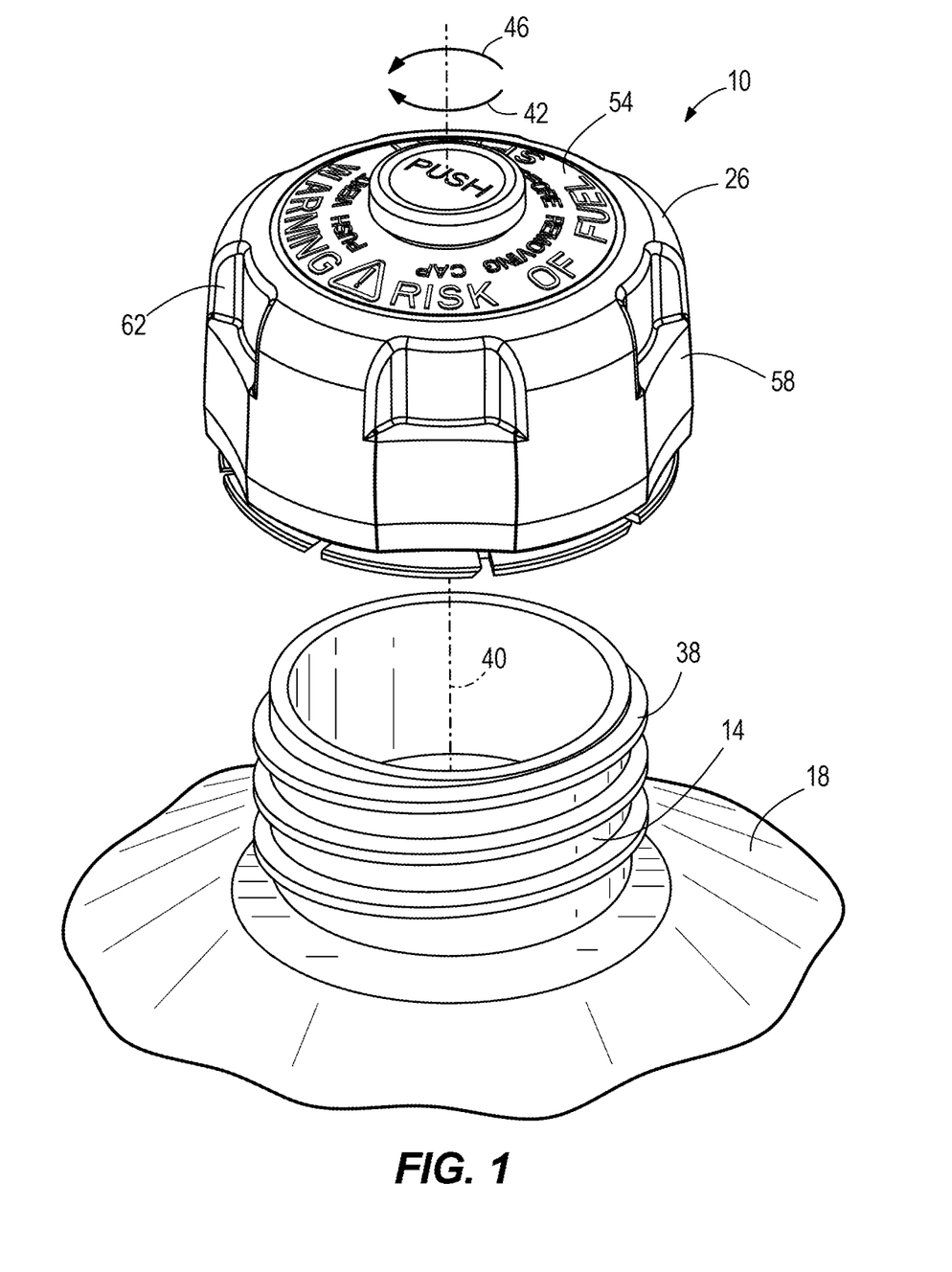
FIG. 1 is a perspective view illustrating a pressure relief cap according to an independent embodiment of the disclosure.

FIG. 1 illustrates a pressure relief cap 10 that is removably couplable to an opening or inlet 14 of a container 18. When positioned on the inlet 14, the illustrated cap 10 blocks the inlet 14 to enclose the contents of the container 18 while still allowing pressurized gasses to be vented from the container 18 under certain conditions. In some embodiments, the container 18 includes a fuel tank, such as a standalone fuel tank or a fuel tank incorporated into a vehicle or other powered machine. In other embodiments, the pressure relief cap 10 can be used with any other container storing any other contents.

The illustrated pressure relief cap 10 includes a body 22 (FIG. 2) and a handle 26 selectively coupled to the body 22. The body 22 has an annular wall 30 with internal threads 34 engageable with external threads 38 on the inlet 14 of the container 18 to couple the body 22 to the container 18. In an alternative construction (not shown), the body 22 may include external threads engageable with internal threads on the inlet 14. The body 22 is rotatable about an axis 40 in a tightening direction 42 and a loosening direction 46 to respectively couple and decouple the body 22 from the inlet 14.

Figure 9:
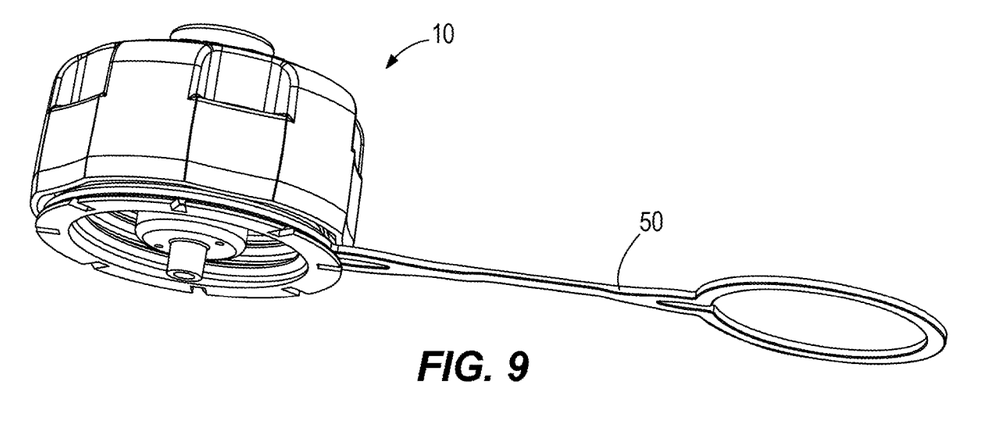
FIG. 9 is a perspective view of the pressure relief cap of FIG. 1 including a tether.

The body 22 carries a gasket 48, which surrounds the annular wall 30 and engages an outer edge of the inlet 14 to create a substantially liquid and/or gas-tight seal between the body 22 and the inlet 14 when the body 22 is coupled to the inlet 14. In some embodiments, a tether 50 (FIG. 9) may be provided to retain the cap 10 with the container 18 even when the body 22 is decoupled from the inlet 14.

Figure 2:
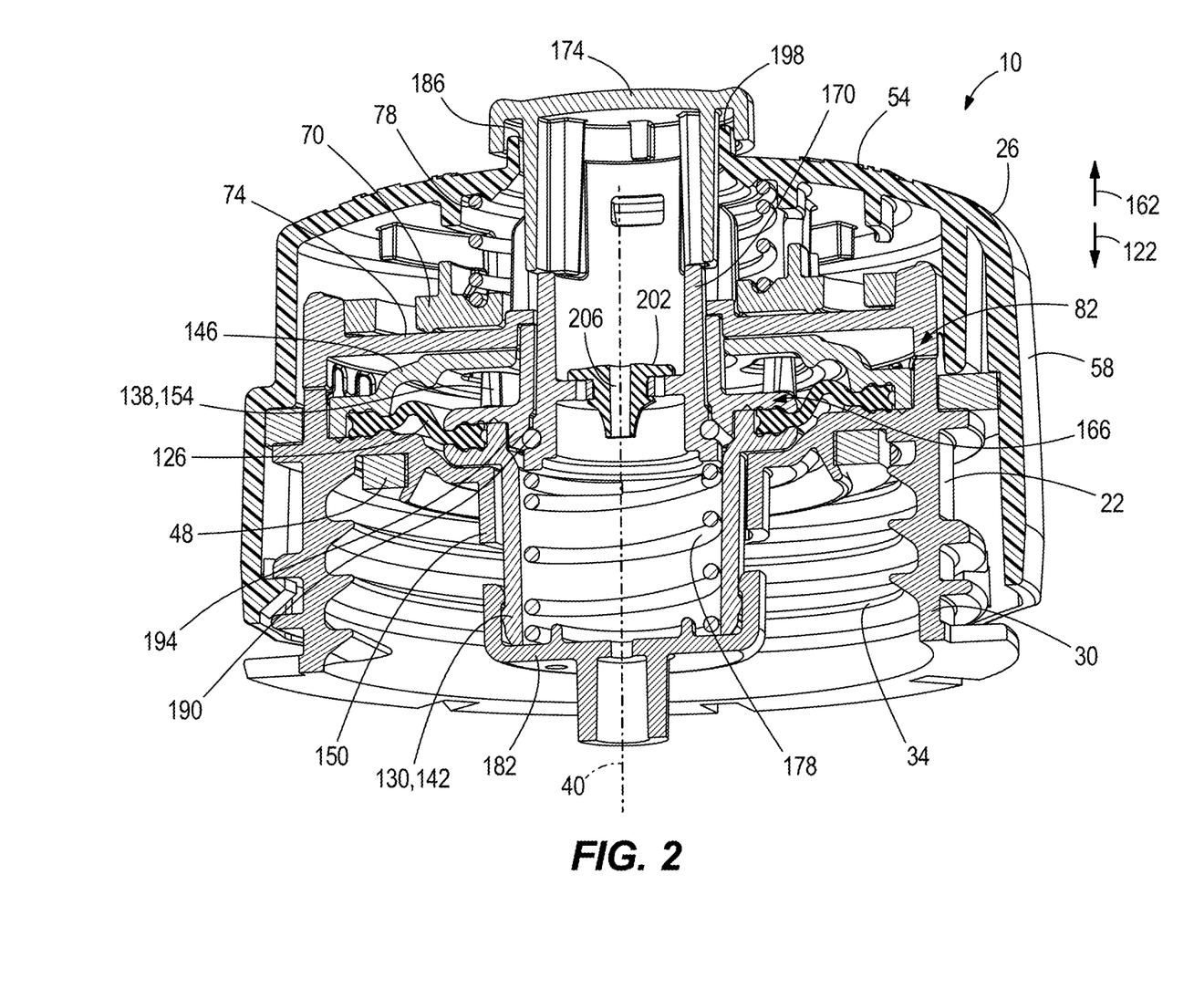
FIG. 2 is a cross-sectional view of the cap of FIG. 1.

Referring to FIGS. 1-2, the handle 26 has a top side 54 and a circumferential side 58 extending downward from the top side 54. In the illustrated embodiment, the circumferential side 58 is provided with a plurality of ridges or undulations 62, which may enhance a user's ability to grip and rotate the handle 26 (e.g., when tightening or loosening the cap 10). The handle 26 is selectively coupled to the body 22 via a motion control mechanism 66 (FIG. 2). As described in greater detail below, the motion control mechanism 66 is operable to selectively couple the handle 26 and the body 22 for co-rotation and to selectively permit the handle 26 to rotate relative to the body 22.

Figure 3:
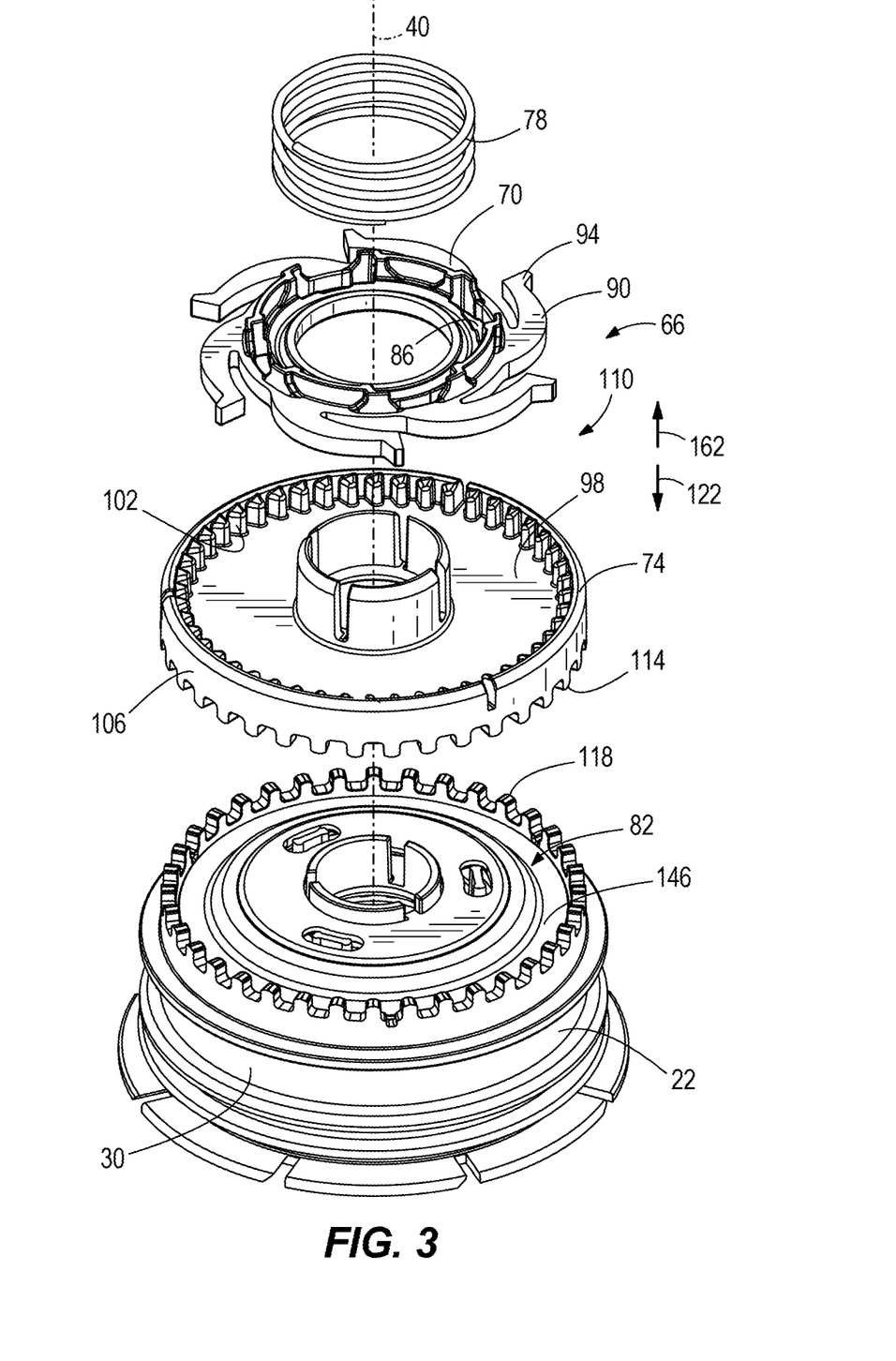
FIG. 3 is an exploded view of a motion control mechanism of the cap of FIG. 1.

Referring to FIG. 3, the illustrated motion control mechanism 66 includes a ratchet 70, a clutch plate 74, a first biasing member 78, and a diaphragm assembly 82. The ratchet 70 is fixed to the inside of the handle 26 (e.g., via a snap fit) and co-rotates with the handle 26. The ratchet 70 includes a central hub 86 and a plurality of flexible arms 90 extending outward from the hub 86. Each of the flexible arms 90 terminates with a pawl 94.

The ratchet 70 is received in an annular recess 98 on top of the clutch plate 74. The flexible arms 90 press the pawls 94 into engagement with ratchet teeth 102 that extend radially inwardly from an outer annular wall 106 of the clutch plate 74. The ratchet 70 and the clutch plate 74 thus define a ratchet assembly 110 that limits the amount of torque that may be transferred from the ratchet 70 (and, therefore, from the handle 26) to the clutch plate 74. Once a predetermined torque threshold is reached (based at least in part on the constructions of the pawls 94, the ratchet teeth 102, the flexible arms 90, etc.), the pawls 94 slide away from the ratchet teeth 102 while the arms 90 bend inward. In the illustrated embodiment, the ratchet assembly 110 only limits torque transfer in one rotational direction (e.g., the tightening direction 42). In some embodiments, the ratchet assembly 110 may be omitted, such that the handle 26 may be directly coupled to the clutch plate 74.

With continued reference to FIG. 3, the clutch plate 74 further includes a first plurality of axially-extending teeth 114 that extend downwardly from a bottom side of the outer annular wall 106. The first plurality of teeth 114 is engageable with a second plurality of axially-extending teeth 118 that extend upwardly from a top side of the body 22. The clutch plate 74 is movable along the axis 40 to engage and disengage the teeth 114, 118.

The clutch plate 74 is biased downwardly, in the direction of arrow 122, by the first biasing member 78 such that the teeth 114, 118 are biased into engagement thereby coupling the clutch plate 74 and the body 22 for co-rotation. In the illustrated embodiment, the first biasing member 78 includes a coil spring disposed between the ratchet 70 and an underside of the handle 26 (FIG. 2). The first biasing member 78 thus bears against the ratchet 70, which in turn bears against the top side of the clutch plate 74. In other embodiments (not shown), the first biasing member 78 may include, for example, magnets, a disc spring, or any other means for biasing the clutch plate 74 toward the body 22.

Figure 4:
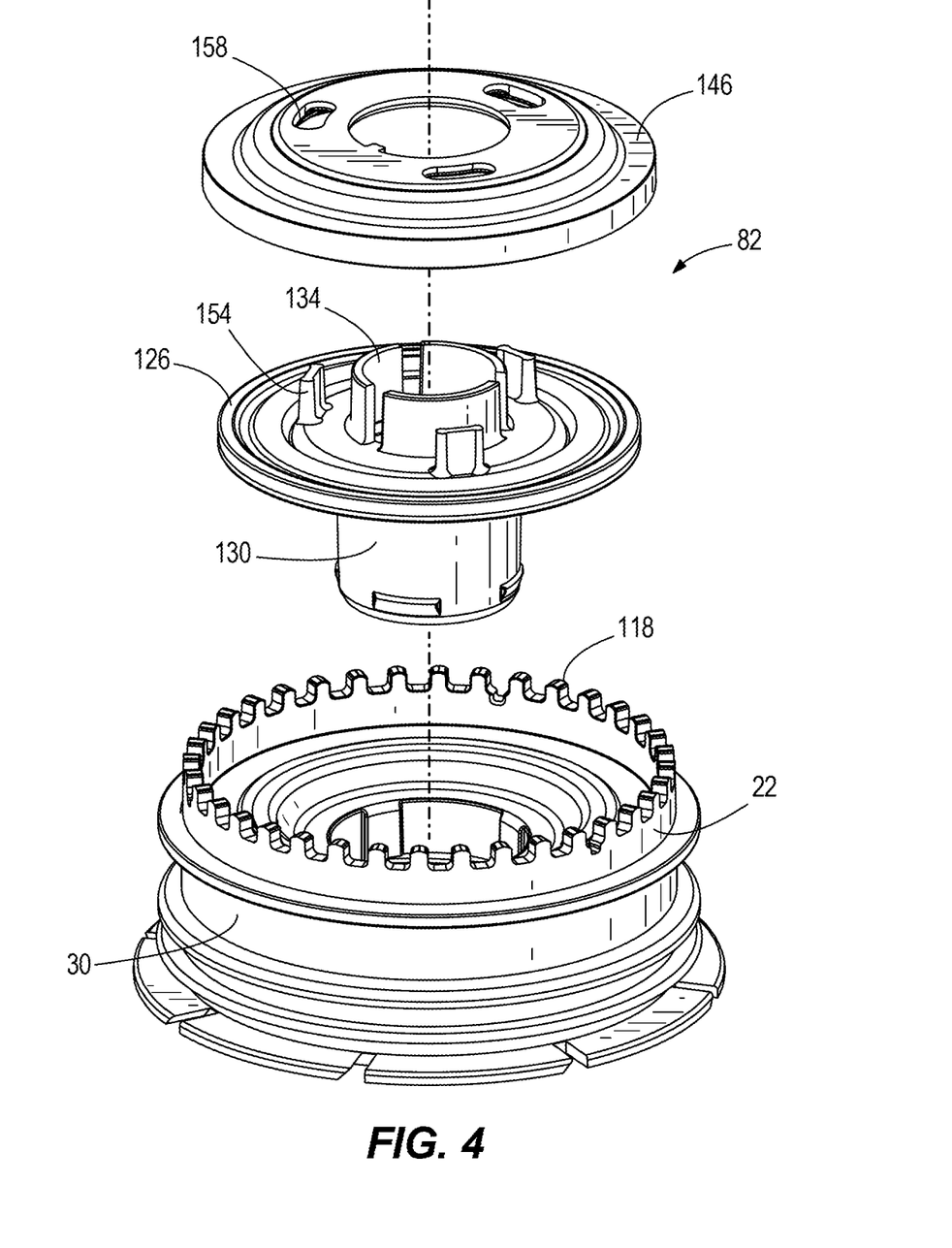
FIG. 4 is an exploded view illustrating a diaphragm assembly of the motion control mechanism of FIG. 3.
Figure 5:
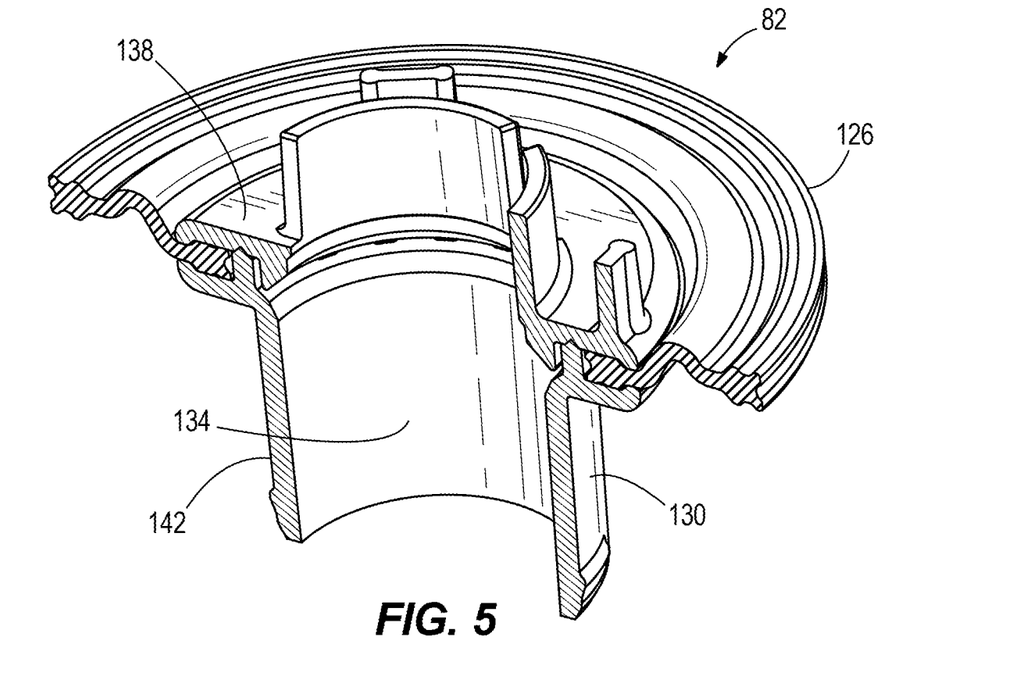
FIG. 5 is a cross-sectional view of the diaphragm assembly of FIG. 4.
Figure 6:
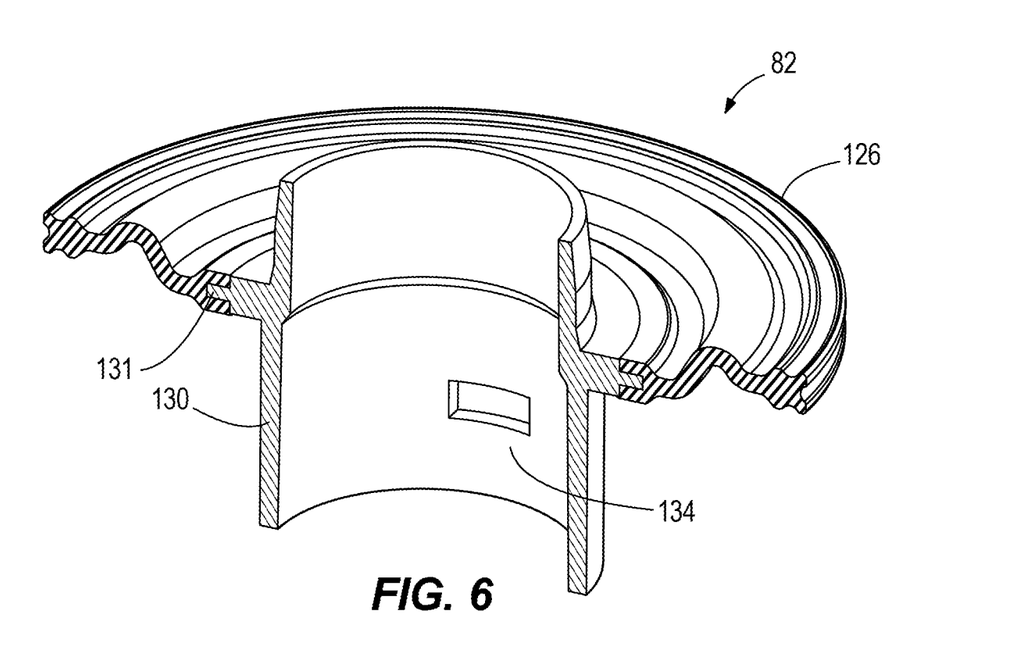
FIG. 6 is a cross-sectional view of an alternative construction of a diaphragm assembly.

Referring to FIGS. 4-6, the diaphragm assembly 82 includes a flexible diaphragm 126 and a rigid central housing 130 fixed to an inner periphery of the diaphragm 126. The central housing 130 includes a passageway 134 that extends axially through the central housing 130. In one embodiment, the central housing 130 includes an upper housing portion 138 and a lower housing portion 142 (FIG. 5). The inner periphery of the diaphragm 126 is sandwiched between the housing portions 138, 142, and the housing portions 138, 142 are affixed to the diaphragm 126 (e.g., via ultrasonic welding).

In another embodiment (see FIG. 6), the central housing 130 is formed as a single unitary component, and the diaphragm 126 is molded (e.g., via an overmolding process) onto a radially-extending flange 131 of the central housing 130. In still other embodiments (not shown), the diaphragm 126 and the central housing 130 can have other constructions and can be fixed together in various other ways.

Referring to FIG. 2, an outer periphery of the diaphragm 126 is sandwiched between the top side of the body 22 and a lid 146 of the diaphragm assembly 82. The outer periphery of the diaphragm 126 is thus fixed to the body 22. The lower housing portion 142 of the central housing 130 is slidably received within a central aperture 150 defined in the body 22. As described in greater detail below, the diaphragm 126 can flex to permit axial movement of the central housing 130 (i.e., in the directions of arrows 122 and 162) relative to the body 22 and the lid 146.

In the illustrated embodiment, the upper housing portion 138 includes a plurality of axially-extending posts 154 aligned with corresponding apertures 158 in the lid 146 (FIG. 4). The posts 154 are slidable within the apertures 158 to guide movement of the central housing 130 and inhibit rotation of the central housing 130 relative to the lid 146 and the body 22.

The posts 154 are also engageable with the bottom side of the clutch plate 74 (FIG. 2). As such, upward movement of the central housing 130 in the direction of arrow 162 causes corresponding upward movement of the clutch plate 74 against the biasing force of the first biasing member 78. In other words, upward flexure of the diaphragm 126 moves the clutch plate 74 upwardly toward a disengaged position (FIG. 7), in which the teeth 114 on the clutch plate 74 are disengaged from the teeth 118 on the body 22. Thus, when the clutch plate 74 is in the disengaged position, the handle 26 of the cap 10 is rotatable relative to the body 22.

The illustrated cap 10 further includes a relief valve assembly 166 coupled to the inner periphery of the diaphragm 126 for movement therewith relative to the body 22 (FIG. 2). The relief valve assembly 166 includes the central housing 130, a plunger 170 slidably received within the central housing 130, an actuator 174 coupled to a top end of the plunger 170, and a second biasing member 178 disposed between the plunger 170 and a retainer 182 on the lower housing portion 142.

In the illustrated embodiment, the second biasing member 178 includes a coil spring, but, in other embodiments (not shown), the second biasing member 178 may include, for example, magnets, a disc spring, or any other means for biasing the plunger 170. The actuator 174 extends through an opening 186 in the top side 54 of the handle 26. In the illustrated embodiment, the actuator 174 is configured as a push-button. The plunger 170 includes a peripheral seal 190 (e.g., an O-ring). The second biasing member 178 acts on the plunger 170 to bias the seal 190 upwardly, in the direction of arrow 162, and into engagement with a seat 194 formed in the upper housing portion 138. When engaged, the seal 190 and the seat 194 create a substantially gas-tight seal.

The plunger 170 is axially movable relative to the central housing 130 between a first position (FIG. 7), in which the seal 190 is engaged with the seat 194 to define a closed state of the relief valve assembly 166, and a second position (FIG. 8), in which the seal 190 is disengaged from the seat 194 to define an open state of the relief valve assembly 166. The actuator 174 moves with the plunger 170, and depressing the actuator 174 downwardly in the direction of arrow 122 manually moves the plunger 170 toward the second position and opens the relief valve assembly 166. In the illustrated embodiment, an annular ridge 198 extends upwardly from the top side 54 of the handle 26 and engages the underside of the actuator 174 to limit downward movement of the actuator 174 and the plunger 170 beyond the second position.

Referring to FIG. 2, the illustrated relief valve assembly 166 further includes an auxiliary valve 202 coupled to and movable with the plunger 170. The auxiliary valve 202 is configured to open automatically in response to pressure on an inboard side of the valve 202 (i.e., pressure within the container 18) reaching a predetermined threshold pressure. In the illustrated embodiment, the auxiliary valve 202 includes a one-way valve made of an elastomeric material that resiliently deforms to open a passageway 206 through the valve 202 when exposed to a pressure greater than or equal to the predetermined threshold pressure. Alternatively, other types of one-way valves (not shown) may be used. The threshold pressure at which the auxiliary valve 202 opens can be set, for example, based on the material(s) and/or construction of the auxiliary valve 202. In some embodiments (not shown), the auxiliary valve 202 may be omitted.

In operation, to close the container 18, a user inserts the body 22 of the cap 10 into the inlet 14 and grasps and rotates the handle 26 in the tightening direction 42 (FIGS. 1-2). Torque is transferred from the handle 26, through the ratchet assembly 110 and to the body 22 via the engaged teeth 114, 118 (FIG. 3). The body 22 can thus be threaded onto the threads 38 of the inlet 14.

If torque applied to the handle 26 in the tightening direction 42 exceeds the torque threshold of the ratchet assembly, the arms 90 flex inwardly, and the pawls 94 ride over the associated ratchet teeth 102. As such, the handle 26 and the ratchet 70 rotate relative to the clutch plate 74 and the body 22, and the torque-transmitting connection between the handle 26 and the body 22 is at least momentarily disengaged. The ratchet assembly 110 may thus prevent over-tightening of the cap 10. In addition, when the pawls 94 ride over the ratchet teeth 102, the ratchet assembly 110 may provide audible and/or tactile feedback to the user that a sufficient level of torque (e.g., at or greater than a minimum retention torque) has been achieved.

Figure 7:
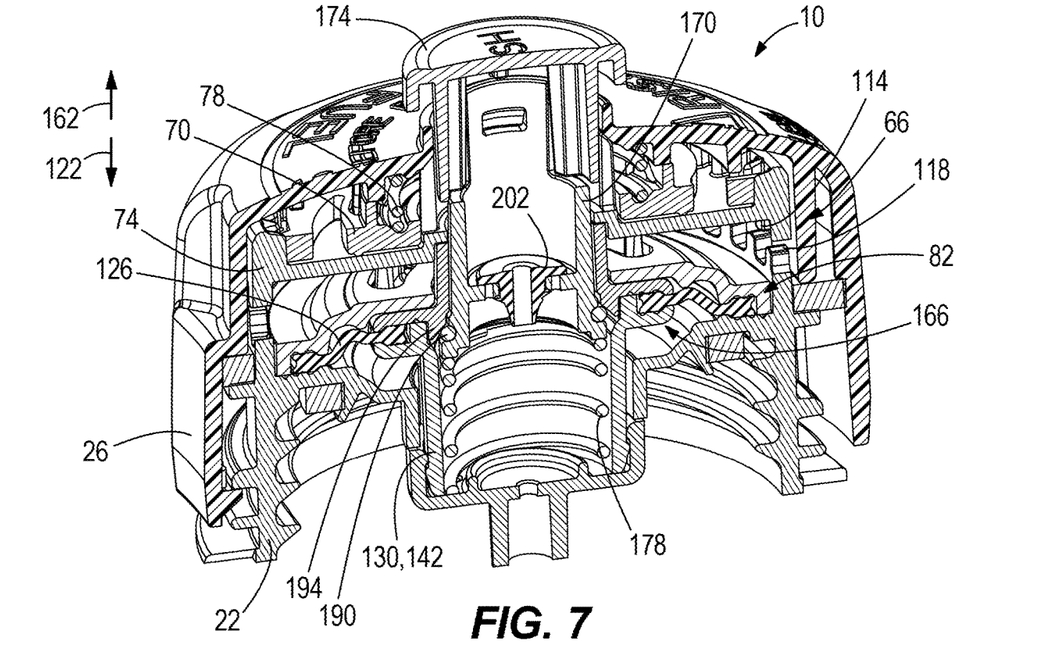
FIG. 7 is a cross-sectional view of the cap of FIG. 1, illustrating a clutch plate of the motion control mechanism in a disengaged position and a relief valve assembly in a closed state.
Figure 8:
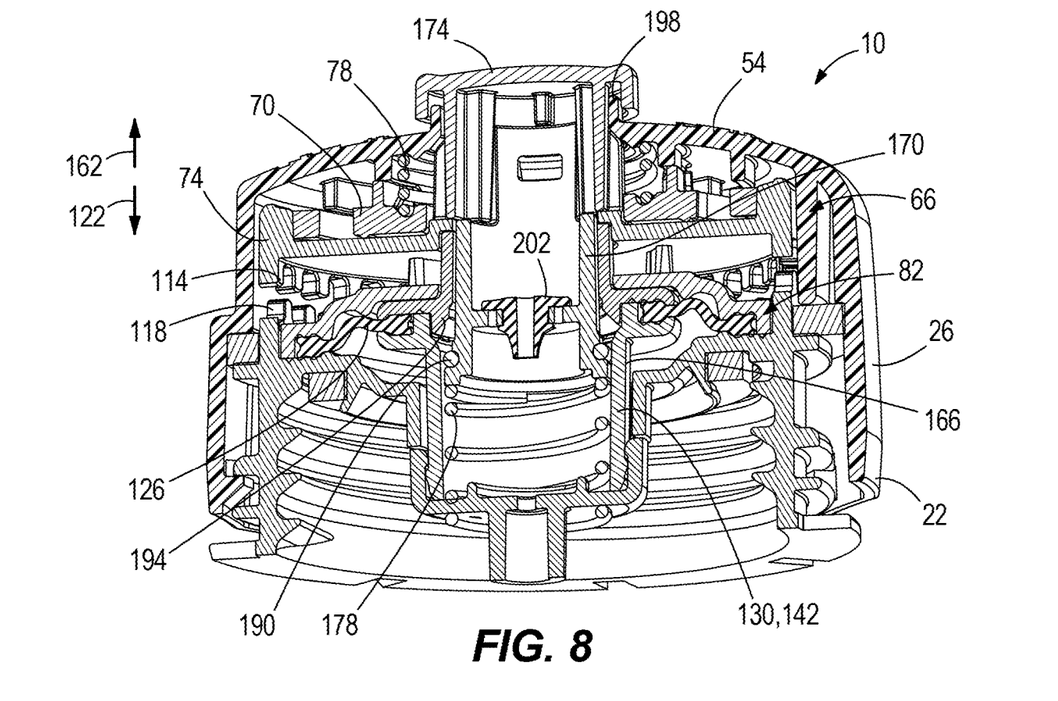
FIG. 8 is a cross-sectional view of the pressure relief cap of FIG. 1, illustrating the clutch plate in the disengaged position and the relief valve assembly in an open state.

With the cap 10 coupled to the container 18, pressure may build within the container 18 (e.g., due to temperature changes, phase changes of the contents of the container, etc.). The underside of the diaphragm 126 is exposed to the pressure within the container 18. As such, when sufficient pressure builds within the container 18, the diaphragm 126 flexes upwardly in the direction of arrow 162. The central housing 130 and relief valve assembly 166 move upwardly together with the inner periphery of the diaphragm 126. The posts 154 on the upper housing portion 138 bear against the underside of the clutch plate 74, which moves the clutch plate 74 upwardly from the engaged position (FIG. 2) toward the disengaged position (FIG. 7).

With this movement, the plunger 130 and the actuator 174 also move upwardly, and the actuator 174 rises up from the top side 54 of the handle 26. The actuator 174 can thus provide a visual indication to the user of elevated pressure within the container 18. In the illustrated embodiment, the actuator 174 has a contrasting color (e.g., red) that enhances its visibility relative to the handle 26.

Upon reaching the disengaged position (which, in the illustrated embodiment, is offset from the engaged position by about 0.11 inches), the teeth 114 on the clutch plate 74 are disengaged from the teeth 118 on the body 22. As such, the torque-transmitting connection between the handle 26 and the body 22 is disengaged, and the handle 26 can be rotated in either direction 42, 46 relative to the body 22. The handle 26 may rotate freely, or the teeth 114, 118 may remain partially engaged but slip when torque is applied to the handle 26. In either case, the user is prevented from unscrewing the cap 10 when pressure in the container 18 is elevated.

If the pressure within the container 18 exceeds the threshold pressure of the auxiliary valve 202, the auxiliary valve 202 automatically opens, allowing gasses from the container 18 to flow through the passageway 206, which fluidly communicates with the atmosphere surrounding the cap 10. In other words, the illustrated relief valve assembly 166 is operable in an automatic mode to relieve pressure from the container 18 when the pressure exceeds the threshold pressure. The auxiliary valve 202 remains open until the pressure within the container 18 falls below the threshold pressure. The threshold pressure is preferably selected so as to be greater than the pressure required to move the clutch plate 74 to the disengaged position.

The relief valve assembly 166 is also operable in a manual mode. In order to manually relieve the pressure from the container 18, the user presses down on the actuator 174. This in turn moves the plunger 170 downwardly in the direction of arrow 122 toward the second position (FIG. 8) and opens the relief valve assembly 166. With the seal 190 spaced from the seat 194, gas can flow through the lower housing portion 142, past the seal 190, and into the upper housing portion 138, which is in fluid communication with the atmosphere surrounding the cap 10. As such, pressure within the container 18 is relieved.

As the pressure within the container 18 is relieved, the diaphragm 126 returns downwardly in the direction of arrow 122, under the influence of the first biasing member 78. This allows the clutch plate 74 to return to the engaged position (FIG. 2) to re-establish a torque-transferring connection between the handle 26 and the body 22. When the user releases the actuator 174, the plunger 170 returns upwardly under the influence of the second biasing member 178 to close the relief valve assembly 166.

In the illustrated embodiment, the actuator 174 itself does not bear against the clutch plate 74 when the user depresses the actuator 174. The annular ridge 198 limits downward movement of the actuator 174, and the clutch plate 74 only returns to the engaged position once pressure within the container 18 has dropped below a level sufficient to counteract the force of the first biasing member 78, advantageously ensuring that pressure is relieved before the cap 10 can be removed from the container 18.

Figure 10:
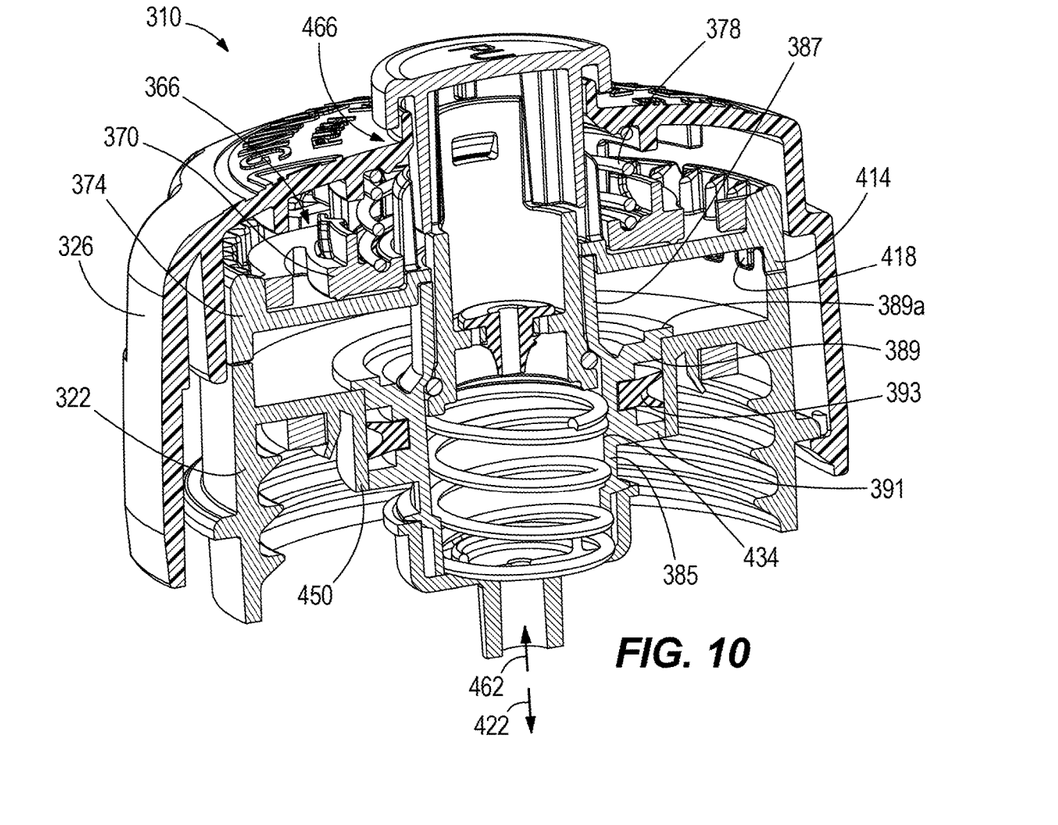
FIG. 10 is a cross-sectional view of a pressure relief cap according to another independent embodiment of the disclosure.

FIG. 10 illustrates a pressure relief cap 310 according to another independent embodiment. The pressure relief cap 310 is similar to the pressure relief cap 10 described above with reference to FIGS. 1-9, and the following description focuses primarily on differences between the pressure relief cap 310 and the pressure relief cap 10. In addition, features and elements of the pressure relief cap 310 corresponding with features and elements of the pressure relief cap 10 are given like reference numbers plus 300.

The pressure relief cap 310 includes a body 322 and a handle 326 coupled to the body 322 via a motion control mechanism 366. The motion control mechanism 366 includes a ratchet 370, a clutch plate 374, and a first biasing member 378. Instead of a diaphragm assembly, however, the motion control mechanism 366 of the pressure relief cap 310 includes a piston 385.

The illustrated piston 385 is hollow and defines a passageway 434 extending axially through the piston 385. The piston 385 is slidably received within a central aperture 450 defined in the body 322 and is axially movable (i.e., in the directions of arrows 422 and 462) relative to the body 322 and the handle 326. The piston 385 includes an upper portion 387 that is engaged with the bottom side of the clutch plate 374. As such, upward movement of the piston 385 in the direction of arrow 462 causes corresponding upward movement of the clutch plate 374 against the biasing force of the first biasing member 378. In other words, upward movement of the piston 385 moves the clutch plate 374 upwardly toward a disengaged position in which teeth 414 on the clutch plate 374 are disengaged from teeth 418 on the body 322.

The illustrated piston 385 includes upper and lower annular walls 389, 391. The upper annular wall 389 includes a flange portion 389a that is engageable with the portion of the body 322 that surrounds the central aperture 450. This engagement limits downward movement (i.e. in the direction of arrow 422) of the piston 385. A seal 393 surrounds the piston 385 between the annular walls 389, 391. In the illustrated embodiment, the seal 393 is a lip seal made of a resilient elastomeric material. In other embodiments, other types of seals may be used. The seal 393 seals between the piston 385 and the wall of the central aperture 450.

The illustrated cap 310 further includes a relief valve assembly 466 coupled to the piston 385 for movement therewith relative to the body 322. The relief valve assembly 466 is similar to the relief valve assembly 166 described above, with the piston 385 replacing the central housing 130.

In operation, if pressure builds within the container 18, the pressure acts on the lower wall 391 of the piston 385, causing the piston 385 to lift up in the direction of arrow 462, until the clutch plate 374 contacts the underside of the handle 326. This disengages the teeth 414 on the clutch plate 374 from the teeth 418 on the body 322 such that the handle 326 is rotatable relative to the body 322. The user may operate the relief valve assembly 466 in the same manner described above with respect to the relief valve assembly 166 to relieve pressure from the container 18. As the pressure within the container 18 is relieved, the piston 385 returns downwardly in the direction of arrow 422, under the influence of the first biasing member 378. This allows the clutch plate 374 to return to the engaged position to re-establish a torque-transferring connection between the handle 326 and the body 322.

Thus, the present disclosure may provide a pressure relief cap with a relief valve assembly configured to manually and, in some embodiments, both automatically and manually relieve pressure from a container. The pressure relief cap may also include a motion control mechanism that prevents the cap from being removed until pressure is relieved from the container and may also prevent the cap from being overtightened.

Although the disclosure has been described in detail with reference to certain preferred embodiments, variations and modifications exist within the scope and spirit of one or more independent aspects of the disclosure as described.

What is claimed is:

1. A pressure relief cap couplable to a container, the cap comprising:
  a body engageable with the container and rotatable about an axis to couple or decouple the body from the container;
  a handle;
  a motion control mechanism operable to selectively couple the handle to the body, the motion control mechanism including a clutch plate, the clutch plate being movable between an engaged position, in which the clutch plate permits torque transfer from the handle to the body, and a disengaged position, in which the clutch plate inhibits torque transfer from the handle to the body; and a relief valve assembly including a manually-operable actuator that is movable relative to the clutch plate;

wherein the clutch plate is movable toward the disengaged position in response to elevated pressure within the container; and wherein the actuator is operable to open the relief valve assembly to allow the clutch plate to return to the engaged position in response to the pressure within the container being relieved through the relief valve assembly.

2. The pressure relief cap of claim 1, wherein the motion control mechanism includes a diaphragm configured to move the clutch plate toward the disengaged position in response to elevated pressure within the container.

3. The pressure relief cap of claim 2, wherein the diaphragm includes an outer periphery fixed to the body and an inner periphery movable relative to the outer periphery along the axis.

4. The pressure relief cap of claim 3, wherein the relief valve assembly is coupled to the inner periphery of the diaphragm for movement therewith relative to the body.

5. The pressure relief cap of claim 1, wherein the relief valve assembly includes a plunger coupled to the actuator and an auxiliary valve disposed within the plunger.

6. The pressure relief cap of claim 5, wherein the auxiliary valve is configured to open automatically when pressure within the container exceeds a predetermined threshold pressure.

7. The pressure relief cap of claim 1, wherein the handle includes a top side and a circumferential side extending downwardly from the top side, and wherein the actuator projects from the top side by a first distance when the clutch plate is in the engaged position and the relief valve assembly is closed and by a second distance greater than the first distance when the clutch plate is in the disengaged position and the relief valve assembly is closed.

8. The pressure relief cap of claim 1, wherein the motion control mechanism includes a piston configured to move the clutch plate toward the disengaged position in response to elevated pressure within the container.

9. The pressure relief cap of claim 8, wherein the motion control mechanism includes a lip seal surrounding the piston.

10. A pressure relief cap couplable to a container, the cap comprising:
a body engageable with the container and rotatable about an axis to couple or decouple the body from the container;
a handle;
a motion control mechanism operable to selectively couple the handle to the body, the motion control mechanism including a ratchet and a clutch plate, the ratchet being rotatable relative to the clutch plate to limit torque transfer from the handle to the body in at least one rotational direction, and the clutch plate being movable between an engaged position, in which the clutch plate is non-rotatably coupled to the body, and a disengaged position, in which the clutch plate is rotatable relative to the body; and a relief valve assembly including a manually-operable actuator,
wherein the clutch plate is configured to move toward the disengaged position in response to elevated pressure within the container, and
wherein the actuator is operable to open the relief valve assembly to allow the clutch plate to return to the engaged position.

11. The pressure relief cap of claim 10, wherein the motion control mechanism includes a diaphragm configured to move the clutch plate toward the disengaged position in response to elevated pressure within the container.

12. The pressure relief cap of claim 11, wherein the diaphragm includes an outer periphery fixed to the body and an inner periphery movable relative to the outer periphery along the axis.

13. The pressure relief cap of claim 10, wherein in the ratchet includes a plurality of flexible arms extending radially outwardly from the ratchet, each of the plurality of flexible arms including a pawl engageable with a plurality of ratchet teeth on the clutch plate.

14. The pressure relief cap of claim 10, wherein the handle includes a top side and a circumferential side extending downwardly from the top side, and wherein the actuator projects from the top side by a first distance when the clutch plate is in the engaged position and the relief valve assembly is closed and by a second distance greater than the first distance when the clutch plate is in the disengaged position and the relief valve assembly is closed.

15. The pressure relief cap of claim 10, wherein the relief valve assembly includes a plunger coupled to the actuator and an auxiliary valve disposed within the plunger.

16. The pressure relief cap of claim 15, wherein the auxiliary valve is configured to open automatically when pressure within the container exceeds a predetermined threshold pressure.

17. The pressure relief cap of claim 10, wherein the motion control mechanism includes a piston configured to move the clutch plate toward the disengaged position in response to elevated pressure within the container.

18. A method of relieving pressure from a container prior to opening the container, the method comprising:
depressing an actuator on a pressure relief cap to open a relief valve assembly of the pressure relief cap;
venting gas from the container through the relief valve assembly;
moving a clutch plate toward an engaged position in response to decreasing pressure within the container through the relief valve assembly when the actuator is moved relative to the clutch plate; and
decoupling the pressure relief cap from the container by rotating a handle of the pressure relief cap in a loosening direction and transmitting torque from the handle to a body of the pressure relief cap via the clutch plate.

19. The method of 18, wherein moving the clutch plate toward the engaged position includes moving an inner periphery of a diaphragm relative to an outer periphery of the diaphragm under the influence of a spring.

20. The method of claim 18, wherein the actuator extends from a top side of the handle.

* * * * *